(12) United States Patent
Feaver et al.

(10) Patent No.: US 12,429,096 B2
(45) Date of Patent: Sep. 30, 2025

(54) JOINT ASSEMBLY AND METHOD OF MANUFACTURING THEREOF

(71) Applicant: Rolls-Royce plc, London (GB)

(72) Inventors: Oliver G Feaver, Derby (GB); David J Robertson, Derby (GB); Daniel M Innis, Derby (GB); Francisco L Palma, Derby (GB)

(73) Assignee: ROLLS-ROYCE PLC, London (GB)

( * ) Notice: Subject to any disclaimer, the term of this patent is extended or adjusted under 35 U.S.C. 154(b) by 452 days.

(21) Appl. No.: 18/050,653

(22) Filed: Oct. 28, 2022

(65) Prior Publication Data

US 2023/0137513 A1     May 4, 2023

(30) Foreign Application Priority Data

Nov. 3, 2021    (GB) ...................................... 2115760

(51) Int. Cl.
   *F16L 27/11*     (2006.01)
   *F16D 3/38*      (2006.01)
   (Continued)

(52) U.S. Cl.
   CPC .......... *F16D 3/385* (2013.01); *F16L 27/0857* (2013.01); *F16L 27/11* (2013.01); *F02C 7/00* (2013.01)

(58) Field of Classification Search
   CPC ....... F16D 3/385; F16L 27/0857; F16L 27/11; F02C 7/00
   (Continued)

(56) References Cited

U.S. PATENT DOCUMENTS

| 4,643,463 A | 2/1987 | Halling et al. |
| 5,280,968 A * | 1/1994 | Moore ................ F16L 27/0857 |
| | | 285/226 |

(Continued)

FOREIGN PATENT DOCUMENTS

| EP | 0519636 A1 | 12/1992 |
| EP | 1484495 A2 | 12/2004 |

(Continued)

OTHER PUBLICATIONS

Dec. 21, 2022 extended Search Report issued in European Patent Application No. 22199330.6.

*Primary Examiner* — Greg Binda
(74) *Attorney, Agent, or Firm* — Oliff PLC

(57) ABSTRACT

A joint assembly for joining a first component to a second component includes a first clevis including first clevis apertures and a second clevis including second clevis apertures. The joint assembly includes a first bearing insert and a second bearing insert fixedly coupled to the first clevis and the second clevis, respectively. The joint assembly includes a ring surrounding the first clevis and the second clevis and including a plurality of ring apertures. The joint assembly further includes a plurality of pins received within the corresponding ring aperture. Each pin includes a head portion and a shaft portion extending from the head portion. The shaft portion is coupled to the ring by a corresponding interference fit. The shaft portion is coupled to the corresponding first or second bearing inserts by a corresponding clearance fit such that the shaft portion is rotatable relative to the corresponding first or second bearing inserts.

16 Claims, 11 Drawing Sheets

(51) Int. Cl.
*F16L 27/08* (2006.01)
*F02C 7/00* (2006.01)

(58) Field of Classification Search
USPC .................................................. 285/226, 265
See application file for complete search history.

(56) References Cited

U.S. PATENT DOCUMENTS

| | | | |
|---|---|---|---|
| 7,040,666 B2 * | 5/2006 | Christianson | ........... F02K 1/805 |
| | | | 285/226 |
| 2018/0128170 A1 | 5/2018 | Owdeh et al. | |
| 2018/0202590 A1 | 7/2018 | Tajiri et al. | |
| 2019/0376399 A1 | 12/2019 | March | |
| 2021/0180733 A1 | 6/2021 | Gupta et al. | |

FOREIGN PATENT DOCUMENTS

| | | | | |
|---|---|---|---|---|
| EP | 3348891 A1 | 7/2018 | | |
| EP | 3578865 A1 | 12/2019 | | |
| EP | 3839315 A1 | 6/2021 | | |
| JP | 4-331891 A | * | 11/1992 | .................... 285/226 |

* cited by examiner

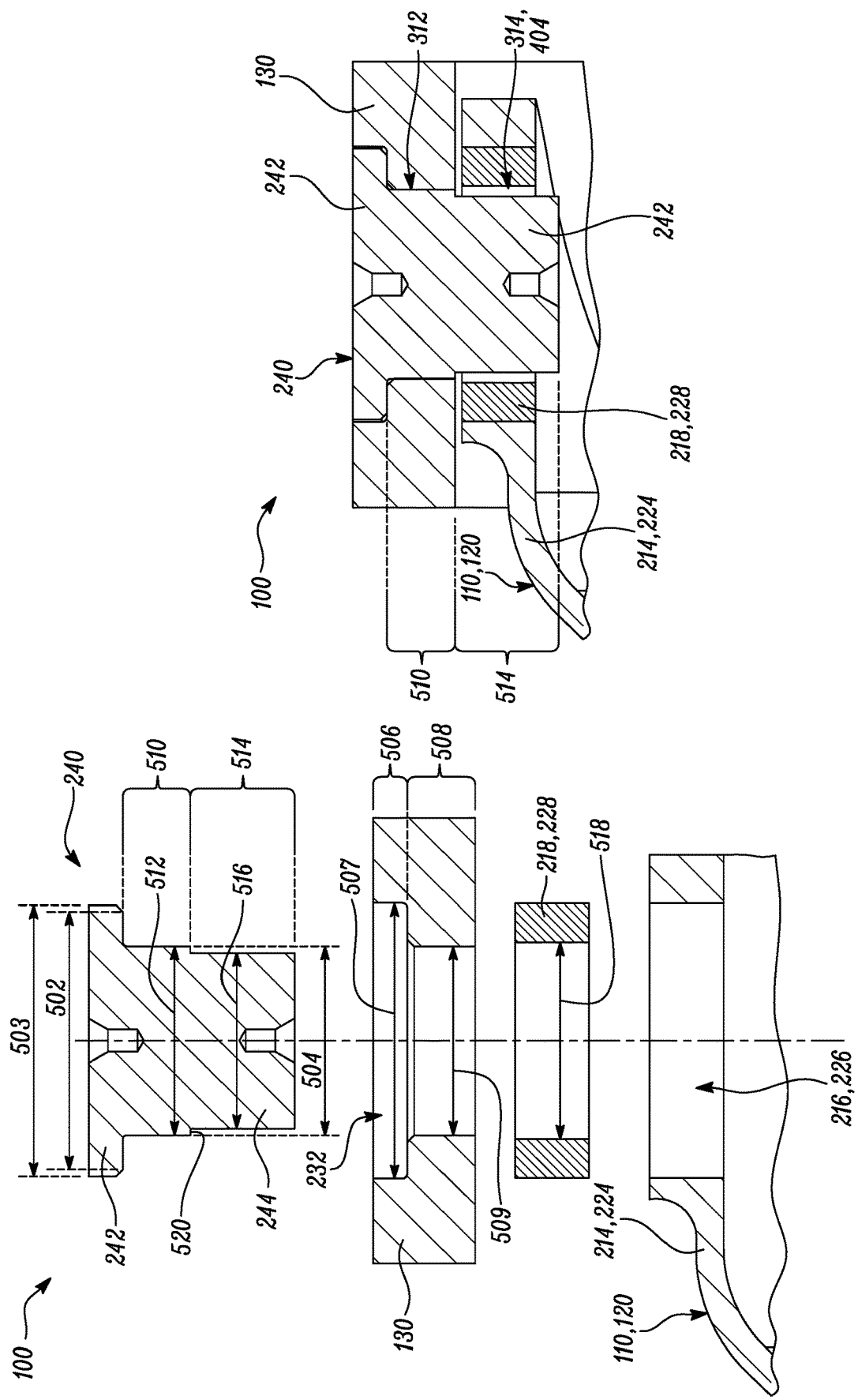

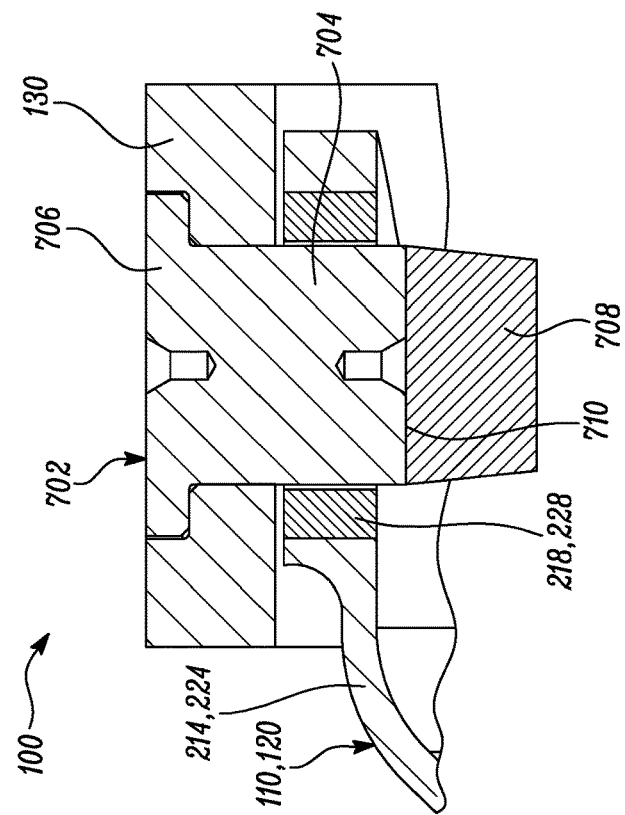
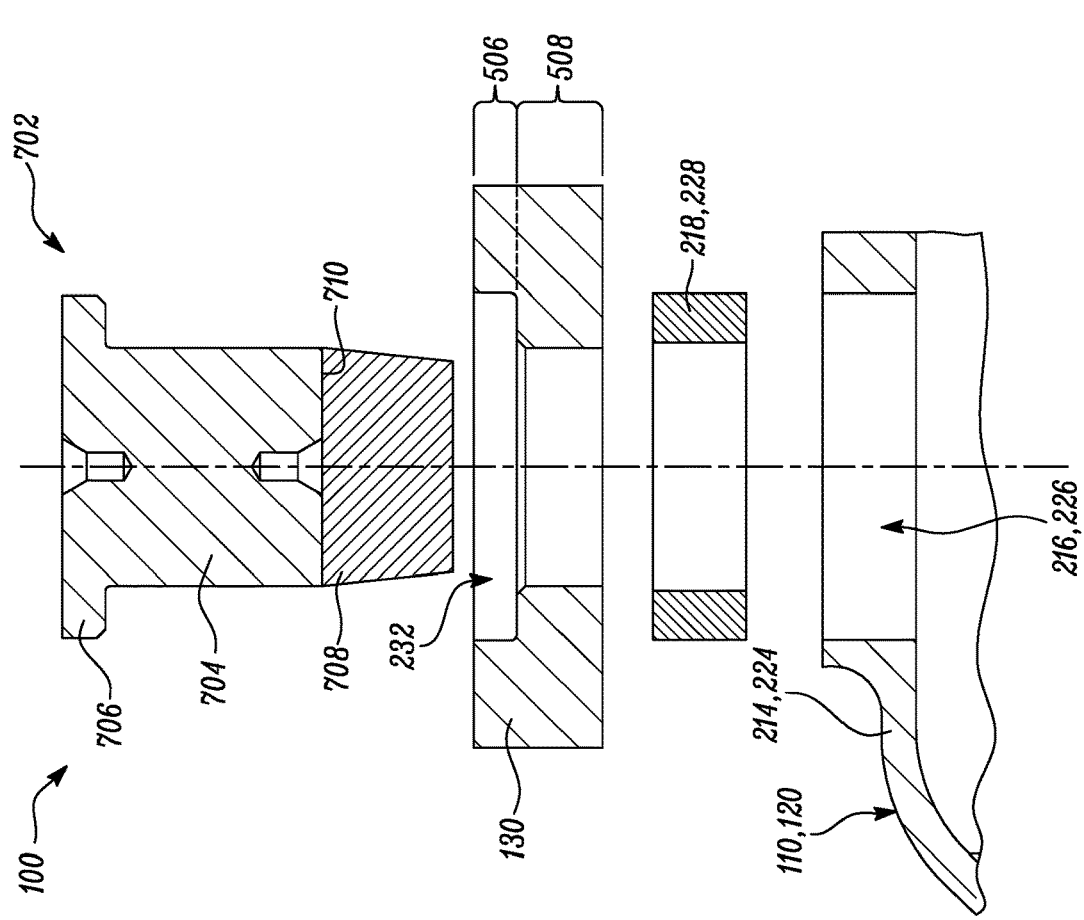
*FIG. 10A*
*FIG. 10B*

JOINT ASSEMBLY AND METHOD OF MANUFACTURING THEREOF

CROSS-REFERENCE TO RELATED APPLICATIONS

This application claims priority pursuant to 35 U.S.C. 119(a) to United Kingdom patent application number GB 2115760.7 filed on Nov. 3, 2021, the entire contents of which is incorporated herein by reference.

BACKGROUND

Field of the Disclosure

The present disclosure generally relates to a joint assembly and a method of manufacturing the joint assembly.

Description of the Related Art

Gas turbine engines generally include duct assemblies that provide conduits for flow of various operating fluids to and from the gas turbine engine. For example, high-pressure air from the gas turbine engine may be routed through an aircraft to serve multiple purposes, including starting additional engines, pressurizing a cabin, de-icing of wings, nacelles, and empennage, and supporting air conditioning units of the aircraft, along with various other systems.

Duct assemblies that carry the high-pressure air must therefore be capable of withstanding high pressures, high temperatures, as well as stresses of vibration, impact, acceleration, deceleration, aircraft component deflection and momentum. Thus, the duct assemblies typically include flexible joints (e.g., gimbals) that allow for angular movements between the connected ducts/pipes.

Gimbals are generally manufactured using traditional extrusion and forming processes which require welds to connect various pins, bellows and flanges. Current welding methods fail to adequately resist stresses that the gimbal is subjected to. Repair or replacement of a failed gimbal may require skilled personnel and partial dismantling of the engine at a suitable location. In addition, a manufacturing and installation cost of conventional gimbals may be typically high.

SUMMARY OF THE DISCLOSURE

According to a first aspect there is provided a joint assembly for joining a first component to a second component. The joint assembly includes a first liner configured to be coupled to the first component. The joint assembly further includes a second liner configured to be coupled to the second component. The joint assembly further includes a bellows fixedly coupled to each of the first liner and the second liner. The joint assembly further includes a first clevis fixedly coupled to the first liner and at least partially enclosing the first liner and the bellows. The first clevis includes a plurality of first extensions and a plurality of first clevis apertures corresponding to the plurality of first extensions. Each first extension defines a corresponding first clevis aperture from the plurality of first clevis apertures therethrough. The joint assembly further includes a second clevis fixedly coupled to the second liner and at least partially enclosing the second liner and the bellows. The second clevis includes a plurality of second extensions angularly spaced apart from each of the plurality of first extensions of the first clevis and a plurality of second clevis apertures corresponding to the plurality of second extensions. Each second extension defines a corresponding second clevis aperture from the plurality of second clevis apertures therethrough. The joint assembly further includes a ring at least partially surrounding the first clevis and the second clevis and including a plurality of ring apertures extending therethrough. The plurality of ring apertures includes a set of first ring apertures corresponding to the plurality of first clevis apertures and a set of second ring apertures corresponding to the plurality of second clevis apertures. Each first ring aperture is aligned with a corresponding first clevis aperture from the plurality of first clevis apertures of the first clevis. Each second ring aperture is aligned with a corresponding second clevis aperture from the plurality of second clevis apertures of the second clevis. The joint assembly further includes a plurality of pins corresponding to the plurality of ring apertures of the ring and configured to rotatably couple the ring to each of the first clevis and the second clevis. Each pin includes a head portion received at least partially in a corresponding ring aperture from the plurality of ring apertures. The head portion is coupled to the ring by a corresponding weld. Each pin further includes a shaft portion extending from the head portion and received at least partially within the corresponding ring aperture. The joint assembly further includes a plurality of first bearing inserts fixedly coupled to the first clevis. Each first bearing insert is at least partially received within a corresponding first clevis aperture from the plurality of first clevis apertures. The joint assembly further includes a plurality of second bearing inserts fixedly coupled to the second clevis. Each second bearing insert is at least partially received within a corresponding second clevis aperture from the plurality of second clevis apertures. The shaft portion of each pin is coupled to the ring by a corresponding interference fit. The shaft portion of each pin is further at least partially received in the corresponding first bearing insert or the corresponding second bearing insert that is received in the corresponding first clevis aperture or the corresponding second clevis aperture aligned with the corresponding ring aperture. The shaft portion of each pin is coupled to the corresponding first bearing insert or the corresponding second bearing insert by a corresponding clearance fit, such that the shaft portion is rotatable relative to the corresponding first bearing insert or the corresponding second bearing insert.

The joint assembly includes the ring including the plurality of ring apertures extending therethrough and the plurality of pins configured to rotatably couple the ring to each of the first clevis and the second clevis. The shaft portion of each pin is coupled to the ring by the corresponding interference fit. The interference fit may allow an increase in load transfer between the ring and the first clevis or the second clevis while also improving an efficiency of the load transfer. Further, the head portion of each pin is coupled to the ring by the corresponding weld. Thus, the interference fit is located away from the corresponding weld. This displaces a heat affected zone of the weld with weakened material properties away from a load path between the ring and the first clevis or the second clevis that results in a more robust design of the joint assembly. Additionally, the interference fit may reduce a bending moment on the pin that allows for a smaller, lighter pin or a higher load capacity of the joint assembly.

The joint assembly includes the plurality of first bearing inserts and the plurality of second bearing inserts fixedly coupled to the first clevis and the second clevis, respectively. The bearing inserts may allow suitable materials to be selected separately for the bearing insert and for the first or second clevises. For example, suitable bearing materials may be selected based on a desired stiffness of the joint assembly, mechanical strength and wear resistance of the bearing materials, and friction between the pin and the first clevis or the second clevis. Further, suitable clevis material may be selected based on ease of manufacturing and desirable strength. This may reduce an overall cost and weight of the joint assembly as well as improve a service life of the joint assembly. Additionally, the first and second bearing inserts may be replaced upon wear and the first or second clevises may be reused.

In some embodiments, the weld between the head portion and the ring includes an electron beam weld or a laser beam weld. The electron beam weld or the laser beam weld may allow a repeatable and desirable weld penetration to be achieved as compared to conventional joining techniques, such as arc welding. Electron beam welding and laser beam welding are generally low heat input processes as compared to arc welding. Thus, the amount of material that is heat affected (or the heat affected zone) during the welding process is substantially less as compared to arc welding. This may enable a lighter design of the joint assembly due to a larger amount of material retaining its original properties after the welding process.

In some embodiments, the head portion has a minimum head diameter and the shaft portion has a maximum shaft diameter less than the minimum head diameter of the head portion. Thus, the pin may have a substantially T-shaped cross-section. Such a design of the pin may shift a location of the heat affected zone of the weld away from the interference fit, and thus, the load path between the ring and the first clevis or the second clevis. This may enhance reliability of the joint assembly.

In some embodiments, each ring aperture includes a wide aperture portion configured to at least partially receive the head portion of the corresponding pin and a narrow aperture portion disposed adjacent to the wide aperture portion and configured to at least partially receive the shaft portion of the corresponding pin.

In some embodiments, the shaft portion includes a wide shaft section disposed adjacent to the head portion and having a minimum wide diameter. The wide shaft section is at least partially received in the corresponding ring aperture. In some embodiments, the shaft portion further includes a narrow shaft section disposed adjacent to the wide shaft section opposite to the head portion and having a maximum narrow diameter less than the minimum wide diameter of the wide shaft section. The narrow shaft section is at least partially received in the corresponding first bearing insert or the corresponding second bearing insert. In some embodiments, the shaft portion further includes a step disposed between the wide and narrow shaft sections.

The narrow shaft section of the shaft portion may align the corresponding ring aperture with the corresponding first bearing insert or the corresponding second bearing insert during manufacture of the joint assembly. This may enable a quick and lean assembly process that eliminates scrappage due to any misalignment between the ring, the pin, and the first clevis or the second clevis.

In some embodiments, the shaft portion includes a uniform shaft section disposed adjacent to the head portion and having a substantially uniform shaft diameter. The uniform shaft section is at least partially received in the corresponding ring aperture and in the corresponding first bearing insert or the corresponding second bearing insert. In some embodiments, the shaft portion further includes a tapered shaft section disposed adjacent to the uniform shaft section opposite to the head portion and tapering away from the uniform shaft section. The tapered shaft section has an average diameter less than the uniform shaft diameter of the uniform shaft section. The tapered shaft section at least partially extends out of the corresponding first clevis aperture or the corresponding second clevis aperture aligned with the corresponding ring aperture.

The tapered shaft section of the shaft portion may align the corresponding ring aperture with the corresponding first bearing insert or the corresponding second bearing insert during manufacture of the joint assembly. This may enable a quick and lean assembly process that eliminates scrappage due to any misalignment between the ring, the pin, and the first clevis or the second clevis.

In some embodiments, each pin further includes an aid guide removably attached to an end of the shaft portion distal to the head portion. The aid guide tapers away from the end of the shaft portion, such that the aid guide is configured to align the corresponding ring aperture with the corresponding first bearing insert or the corresponding second bearing insert as the shaft portion is at least partially received through the corresponding ring aperture and through the corresponding first bearing insert or the corresponding second bearing insert.

The aid guide may align the corresponding ring aperture with the corresponding first bearing insert or the corresponding second bearing insert during manufacture of the joint assembly. The aid guide may be removed after the assembly process.

In some embodiments, each of the pluralities of first and second bearing inserts has an annular shape.

In some embodiments, each of the first and second clevises is made of a clevis material. Each of the pluralities of first and second bearing inserts is made of a bearing material different from the clevis material. A hardness of the clevis material is different from a hardness of the bearing material. Thus, appropriate bearing material and clevis material may be chosen separately based on application requirements. This may reduce an overall cost and weight of the joint assembly as well as improve a service life of the joint assembly.

In some embodiments, each first bearing insert is fixedly coupled to the first clevis by a corresponding first insert weld or a corresponding first interference fit.

In some embodiments, each second bearing insert is fixedly coupled to the second clevis by a corresponding second insert weld or a corresponding second interference fit.

In some embodiments, the first clevis is fixedly coupled to the first liner by one or more first clevis welds.

In some embodiments, the second clevis is fixedly coupled to the second liner by one or more second clevis welds.

In some embodiments, the bellows is fixedly coupled to the first liner by one or more first bellows welds.

In some embodiments, the bellows is fixedly coupled to the second liner by one or more second bellows welds.

According to a second aspect, there is provided gas turbine engine including a first component, a second component and a joint assembly. The joint assembly joins the first component to the second component.

According to a third aspect, there is provided a method of manufacturing a joint assembly. The method includes providing a first clevis including a plurality of first extensions and a plurality of first clevis apertures corresponding to the plurality of first extensions. Each first extension defines a corresponding first clevis aperture from the plurality of first clevis apertures therethrough. The method further includes providing a second clevis including a plurality of second extensions angularly spaced apart from the plurality of first extensions of the first clevis and a plurality of second clevis apertures corresponding to the plurality of second extensions. Each second extension defines a corresponding second clevis aperture from the plurality of second clevis apertures therethrough. The method further includes at least partially surrounding the first clevis and the second clevis with a ring including a plurality of ring apertures extending therethrough, such that each of a set of first ring apertures from the plurality of ring apertures aligns with a corresponding first clevis aperture from the plurality of first clevis apertures of the first clevis and each of a set of second ring apertures from the plurality of ring apertures aligns with a corresponding second clevis aperture from the plurality of second clevis apertures of the second clevis. The method further includes fixedly coupling a plurality of first bearing inserts to the first clevis, such that each first bearing insert is at least partially received within a corresponding first clevis aperture from the plurality of first clevis apertures. The method further includes fixedly coupling a plurality of second bearing inserts to the second clevis, such that each second bearing insert is at least partially received within a corresponding second clevis aperture from the plurality of second clevis apertures. The method further includes inserting a plurality of pins through the plurality of ring apertures, such that a head portion of each pin is at least partially received in a corresponding ring aperture from the plurality of ring apertures and a shaft portion of each pin is at least partially received in the corresponding ring aperture. The shaft portion of each pin is fixedly coupled to the ring by a corresponding interference fit. The method further includes at least partially receiving the shaft portion of each pin in a corresponding first bearing insert or a corresponding second bearing insert that is received in the corresponding first clevis aperture or the corresponding second clevis aperture aligned with the corresponding ring aperture. The shaft portion of each pin is rotatably coupled to the corresponding first bearing insert or the corresponding second bearing insert by a corresponding clearance fit, such that each of the first and second clevises is rotatably coupled to the ring. The method further includes fixedly coupling the head portion of each pin to the ring by electron beam welding or laser beam welding.

In some embodiments, the method further includes fixedly coupling a bellows to a first liner by one or more first bellows welds. The first liner is configured to be coupled to a first component. In some embodiments, the method further includes fixedly coupling the bellows to a second liner by one or more second bellows welds. The second liner is configured to be coupled to a second component. In some embodiments, the method further includes fixedly coupling the first clevis to the first liner by one or more first clevis welds. In some embodiments, the method further includes fixedly coupling the second clevis to the second liner by one or more second clevis welds.

In some embodiments, each first bearing insert is fixedly coupled to the first clevis by a corresponding first insert weld or a corresponding first interference fit. In some embodiments, each second bearing insert is fixedly coupled to the second clevis by a corresponding second insert weld or a corresponding second interference fit.

In some embodiments, the method further includes removably attaching an aid guide to an end of the shaft portion of each pin distal to the head portion. The aid guide tapers away from the end of the shaft portion, such that the aid guide is configured to align the corresponding ring aperture with the corresponding first bearing insert or the corresponding second bearing insert as the shaft portion is at least partially received through the corresponding ring aperture and through the corresponding first bearing insert or the corresponding second bearing insert.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 8A is a schematic sectional exploded view of a pin, a ring, and a first clevis or a second clevis, according to an embodiment of the present disclosure;

FIG. 8B is a detailed schematic sectional view of the pin, the ring, and the first clevis or the second clevis of FIG. 8A in an assembled state, according to an embodiment of the present disclosure;

FIG. 10A is a schematic sectional exploded view of the pin, the ring, and the first clevis or the second clevis, according to yet another embodiment of the present disclosure;

FIG. 10B is a detailed schematic sectional view of the pin, the ring, and the first clevis or the second clevis of FIG. 10A in an assembled state, according to an embodiment of the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
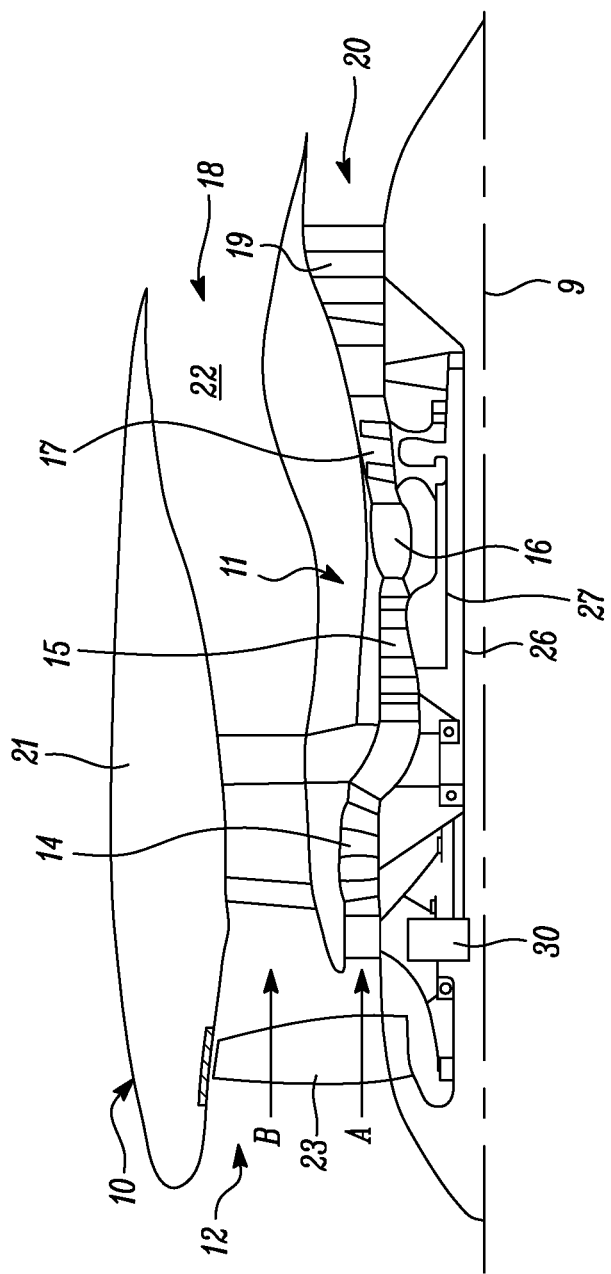
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
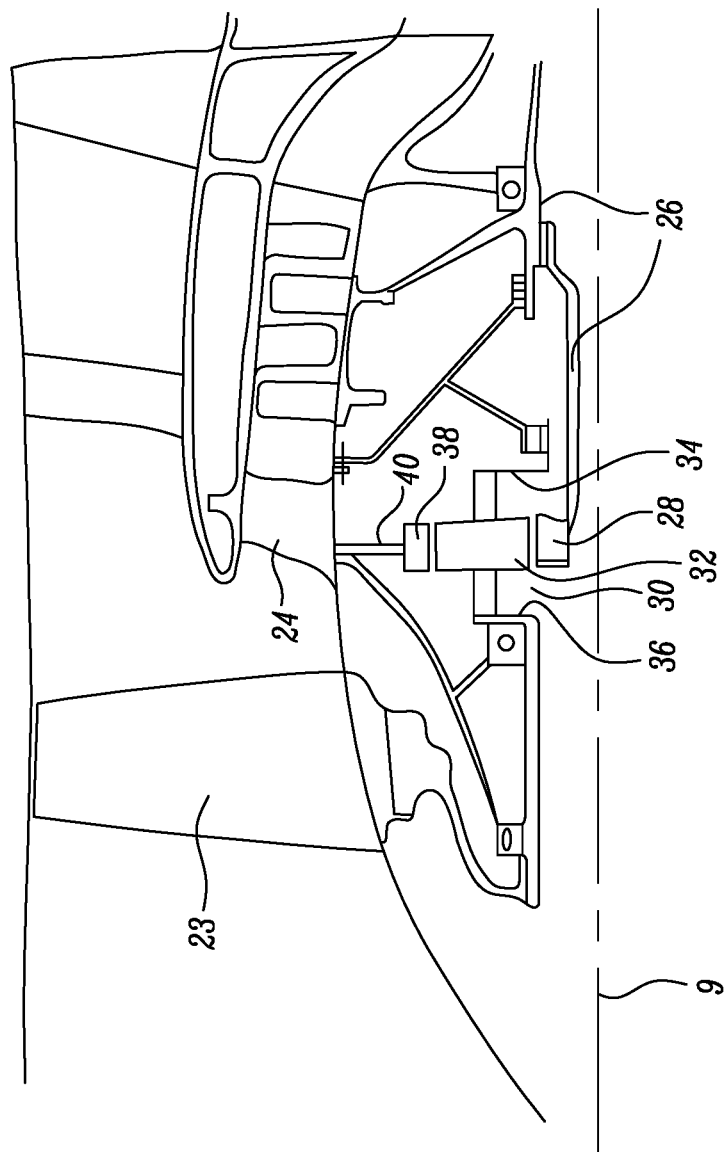
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23), respectively, and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
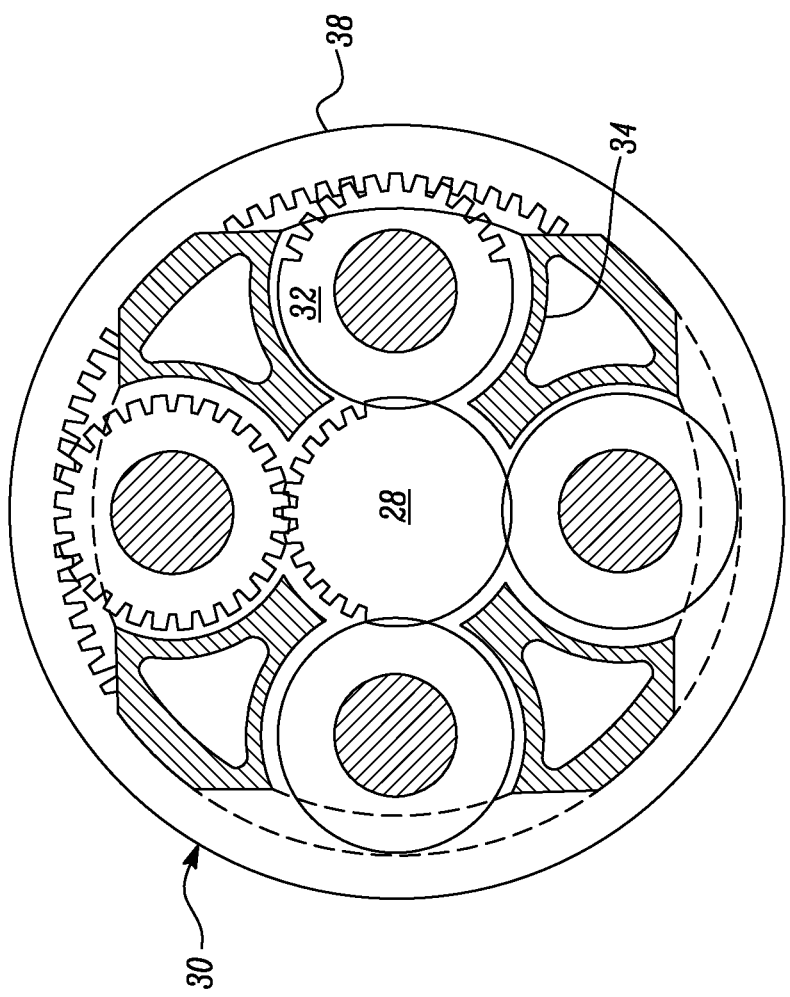
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example, between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example, star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines, and land-based gas turbine engines.

Generally, the gas turbine engine 10 produces very high-pressure air which is ducted in pipe systems for use in various parts of the gas turbine engine 10 and/or in applications external to the gas turbine engine 10. Applications may typically include engine bleed air system (EBAS) ducts, starter air system ducts, and anti-icing ducts.

The pipe system may require flexible joints to accommodate irregular internal passages of the aircraft, and/or other applications in which the pipe system is used. During operation of the gas turbine engine 10, high temperatures and fluctuations in air pressure inside the pipe system may cause stresses on the pipes and joints of the pipe system. Sections of the pipe system may therefore be connected to each other through gimbals. Typically, gimbals are joints that allow a limited amount of movement between sections of the pipe system to accommodate stresses that result from the pipes/ducts moving during operation of the engine and to provide the required amount of flexibility for installation and operation of the pipe system.

Figure 4:
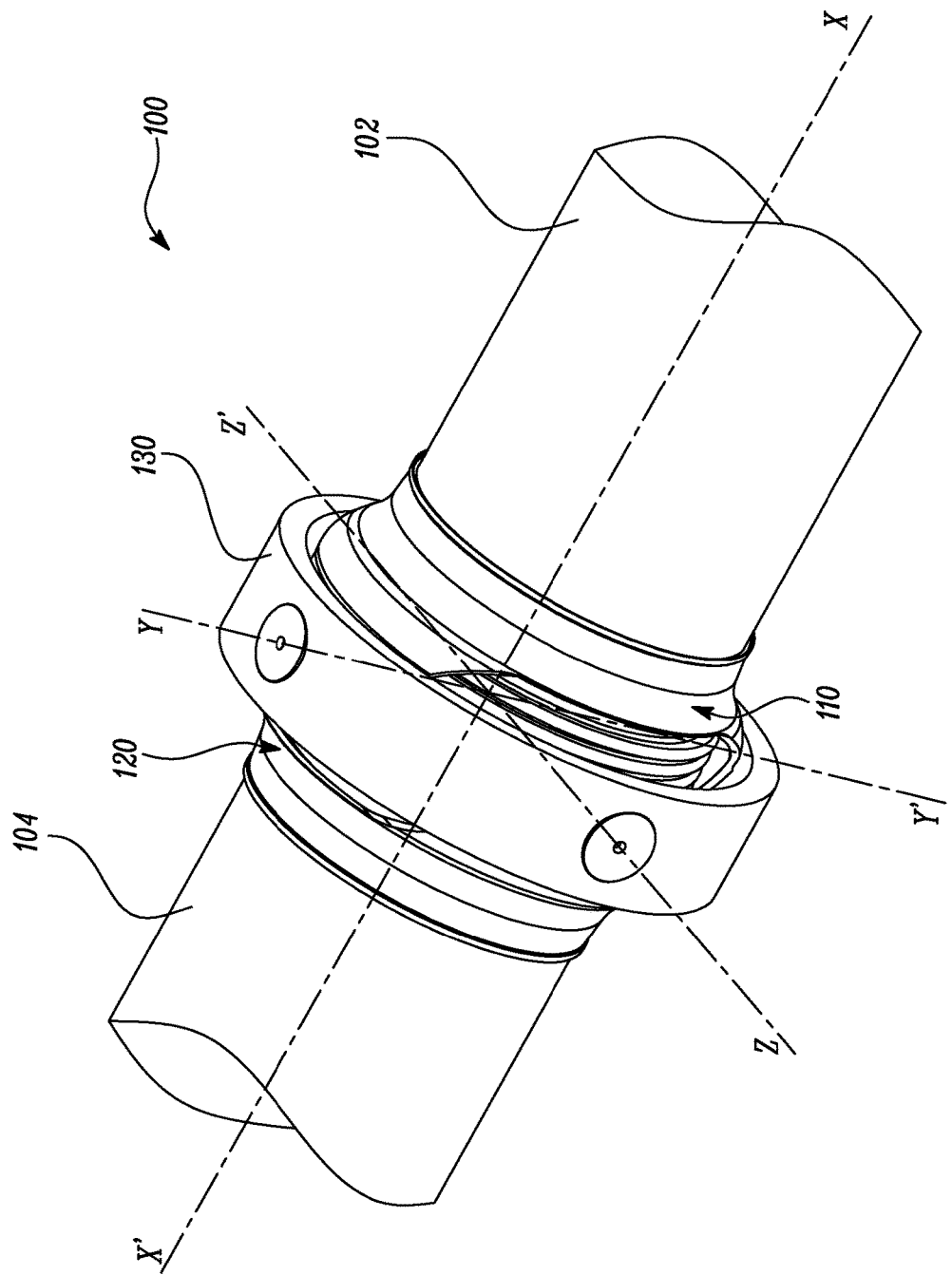
FIG. 4 is a schematic perspective view of a joint assembly, according to an embodiment of the present disclosure.

FIG. 4 illustrates a joint assembly 100 for joining a first component 102 to a second component 104, according to an embodiment of the present disclosure. Specifically, FIG. 4 illustrates a gimbal for joining the first component 102 to the second component 104. The gas turbine engine 10 (shown in FIG. 1) includes the first and second components 102, 104. Specifically, the first and second components 102, 104 may be respective pipe sections of the pipe system of the gas turbine engine 10 (shown in FIG. 1). In some embodiments, the joint assembly 100 is substantially linear such that various components of the joint assembly 100 are arranged along an axis X-X'.

The joint assembly 100 includes a first clevis 110, a second clevis 120, and a ring 130 at least partially surrounding the first clevis 110 and the second clevis 120. In some embodiments, the first clevis 110 and the second clevis 120 are pivotally connected to the ring 130 such that the first clevis 110 is rotatable with respect to the ring 130 about an axis Y-Y' and the second clevis 120 is rotatable with respect to the ring 130 about an axis Z-Z'. Various parts and components of the joint assembly 100 will be described hereinafter in greater detail. In some embodiments, the axes X-X', Y-Y', Z-Z' may be mutually orthogonal to each other.

Figure 5:
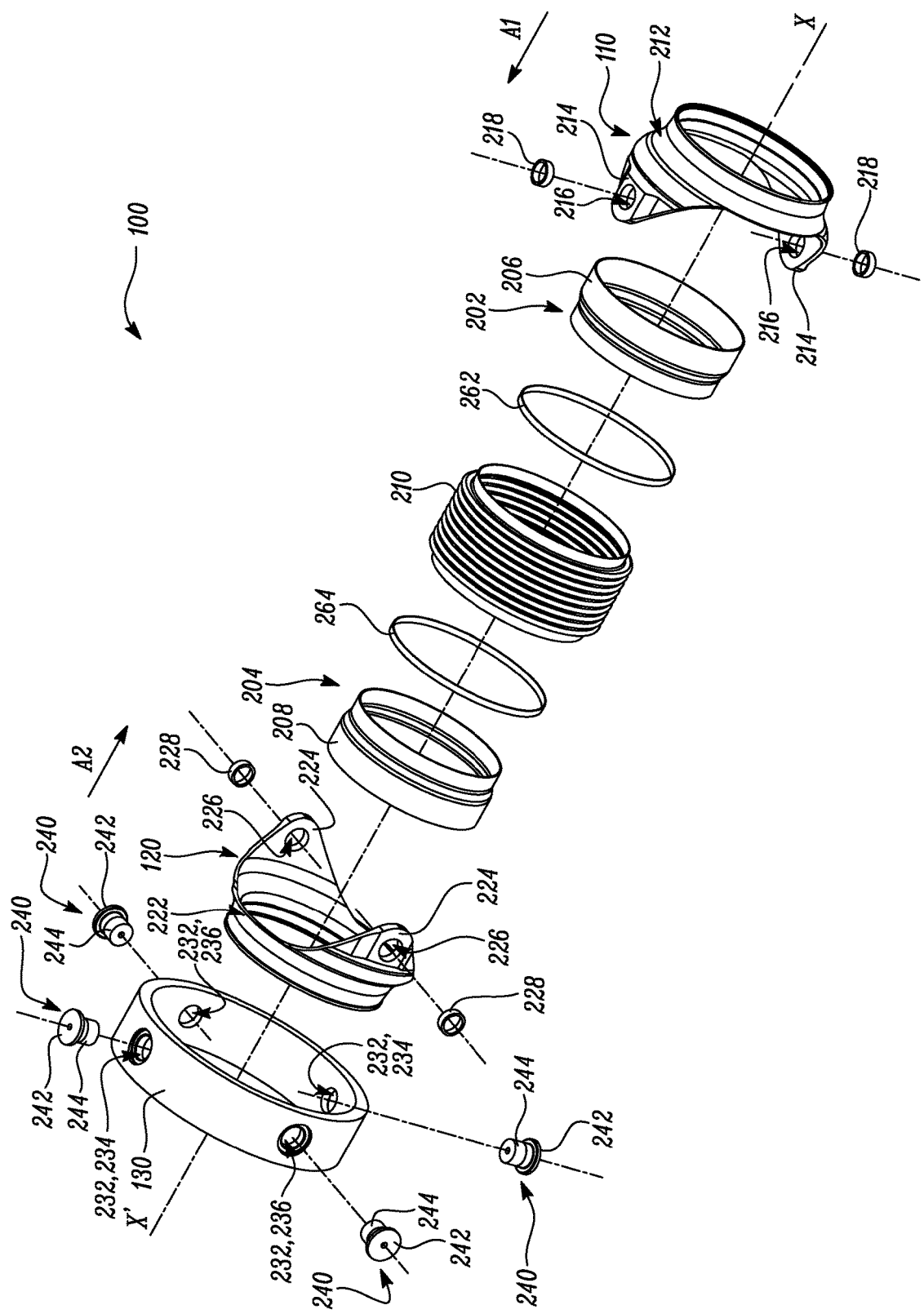
FIG. 5 is a schematic exploded perspective view of the joint assembly of FIG. 4, according to an embodiment of the present disclosure.

FIG. 5 illustrates an exploded view of the joint assembly 100 along the axis X-X', according to an embodiment of the present disclosure. Referring now to FIGS. 4 and 5, the joint assembly 100 further includes a first liner 202 configured to be coupled to the first component 102. The joint assembly 100 further includes a second liner 204 configured to be coupled to the second component 104. In some embodiments, the first and second liners 202, 204 are coupled to the first and second components 102, 104, respectively, through welding. In some embodiments, the first and second liners 202, 204 may be cylindrical in cross-section to assist in providing fluid-tight connections to pipes or ducts that are also typically cylindrical in cross-section.

The joint assembly 100 further includes a bellows 210 fixedly coupled to each of the first liner 202 and second liner 204. In some embodiments, the bellows 210 is fixedly coupled to the first liner 202 and second liner 204 through respective sealing rings 262, 264 (also shown in FIGS. 6B and 7B). In some embodiments, the bellows 210 provides a degree of stiffness to the joint assembly 100 such that a possible relative movement of the first liner 202 and second liner 204 of the joint assembly 100 may be controlled to within known limits. Further, the bellows 210 may be coupled to each of the first liner 202 and second liner 204 such that the bellows 210 may provide an internal passage through which the contents of the first and second components 102, 104, that are connected to the joint assembly 100, may pass through. In some embodiments, the first and second clevises 110, 120 may at least partially protect the bellows 210 and the first and second liners 202, 204, respectively, from an external environment.

The joint assembly 100 further includes the first clevis 110 fixedly coupled to the first liner 202 and at least partially enclosing the first liner 202 and the bellows 210. In some embodiments, a first clevis end portion 212 of the first clevis 110 is fixedly coupled to an end portion 206 of the first liner 202. The first clevis 110 includes a plurality of first extensions 214 and a plurality of first clevis apertures 216 corresponding to the plurality of first extensions 214. Each of the plurality of first extensions 214 extends from the first clevis end portion 212 of the first clevis 110 away from the first component 102 (shown in FIG. 4). In some embodiments, the first clevis 110 and the first extensions 214 may be integrally formed as one-piece component.

Each first extension 214 defines a corresponding first clevis aperture 216 from the plurality of first clevis apertures 216 therethrough. Further, the first clevis 110 includes a pair of first extensions 214 and a pair of corresponding first clevis apertures 216, however, it should be understood that the first clevis 110 may include any number of first extensions 214 and the corresponding first clevis apertures 216. In the illustrated embodiment of FIGS. 4 and 5, the pair of first extensions 214 are disposed diametrically opposite to each other.

The joint assembly 100 further includes a plurality of first bearing inserts 218 fixedly coupled to the first clevis 110. Each first bearing insert 218 is at least partially received within a corresponding first clevis aperture 216 from the plurality of first clevis apertures 216. In some embodiments, each first bearing insert 218 may be fully received within the corresponding first clevis aperture 216. In some other embodiments, one or more of the first bearing inserts 218 may at least partially protrude from the corresponding first clevis apertures 216.

The joint assembly 100 further includes the second clevis 120 fixedly coupled to the second liner 204 and at least partially enclosing the second liner 204 and the bellows 210. In some embodiments, a second clevis end portion 222 of the second clevis 120 is fixedly coupled to an end portion 208 of the second liner 204.

The second clevis 120 includes a plurality of second extensions 224 angularly spaced apart from each of the plurality of first extensions 214 of the first clevis 110 and a plurality of second clevis apertures 226 corresponding to the plurality of second extensions 224. Each of the plurality of second extensions 224 extend from the second clevis end portion 222 of the second clevis 120 away from the second component 104 (shown in FIG. 4). In some embodiments, the second clevis 120 and the second extensions 224 may be integrally formed as one-piece component.

In some embodiments, the first clevis end portion 212 and the second clevis end portion 222 may provide a protective shield for at least a portion of the bellows 210, for example, the portion of the bellow 210 that is not protected, or only partially protected, by the plurality of first and second extensions 214, 224. It should be understood that the first clevis end portion 212 and the second clevis end portion 222 may take various forms to fulfil the intended purpose. For example, the first clevis end portion 212 and/or the second clevis end portion 222 may be annular to maximise protective cover for the bellows 210. Further, a length and/or a shape of the first and second clevis end portions 212, 222 may vary based on application requirements. The first clevis end portion 212 and/or the second clevis end portion 222 may be arranged to complement the configuration of the first and second extensions 214, 224, for example, to maximise protective shielding for the bellows 210 of the joint assembly 100.

Each second extension 224 defines a corresponding second clevis aperture 226 from the plurality of second clevis apertures 226 therethrough. Further, the second clevis 120 includes a pair of second extensions 224 and a pair of corresponding second clevis apertures 226, however, it should be understood that the second clevis 120 may include any number of second extensions 224 and the corresponding second clevis apertures 226. In the illustrated embodiment of FIGS. 4 and 5, the second extensions 224 are disposed diametrically opposite to each other.

In some embodiments, the plurality of first extensions 214 and the plurality of second extensions 224 are equally spaced around the axis X-X' of the joint assembly 100. In some embodiments, the first and second devises 110, 120 may have a common shape. Further, the plurality of first extensions 214 extend generally axially in a first direction A1 and the plurality of second extensions 224 extend generally axially in a second direction A2 opposite to the first direction A1.

The joint assembly 100 further includes a plurality of second bearing inserts 228 fixedly coupled to the second clevis 120. Each second bearing insert 228 is at least partially received within a corresponding second clevis aperture 226 from the plurality of second clevis apertures 226. In some embodiments, each of the second bearing insert 228 may be fully received within the corresponding second clevis aperture 226. In some other embodiments, one or more of the second bearing inserts 228 may at least partially protrude from the corresponding second clevis apertures 226.

In some embodiments, each of the pluralities of first and second bearing inserts 218, 228 has an annular shape, such that outer surfaces of the pluralities of first and second bearing inserts 218, 228 engage with inner surfaces of the corresponding first and second bearing apertures 216, 226.

Fully functional joint assemblies 100 may be made with various numbers of devises, however, in the illustrated embodiment of FIGS. 4 and 5, the joint assembly 100 includes a pair of devises (i.e., the first and second devises 110, 120) angularly spaced around the axis X-X' of the joint assembly 100 that balances a structural strength and a structural simplicity of the joint assembly 100. However, in some other embodiments, the joint assembly 100 may include multiple devises arranged along the axis X-X'.

The joint assembly 100 further includes the ring 130 at least partially surrounding the first clevis 110 and the second clevis 120. The ring 130 includes a plurality of ring apertures 232 extending therethrough. In some embodiments, the ring 130 may be integrally formed in one-piece. The plurality of ring apertures 232 includes a set of first ring apertures 234 corresponding to the plurality of first clevis apertures 216 and a set of second ring apertures 236 corresponding to the plurality of second clevis apertures 226. Each first ring aperture 234 is aligned with a corresponding first clevis aperture 216 from the plurality of first clevis apertures 216 of the first clevis 110. Each second ring aperture 236 is aligned with a corresponding second clevis aperture 226 from the plurality of second clevis apertures 226 of the second clevis 120.

The joint assembly 100 further includes a plurality of pins 240 corresponding to the plurality of ring apertures 232 of the ring 130 and configured to rotatably couple the ring 130 to each of the first clevis 110 and the second clevis 120. Specifically, the first clevis 110 is rotatably coupled to the ring 130 through the plurality of pins 240 and the plurality of first extensions 214. Similarly, the second clevis 120 is rotatably coupled to the ring 130 through the plurality of pins 240 and the plurality of second extensions 224. Thus, the first clevis 110 and the second clevis 120 are able to pivot about the respective axes Y-Y' and Z-Z' through the plurality of pins 240, thereby enabling the joint assembly 100 to accommodate angular movements of the first and second components 102, 104 that are connected through the joint assembly 100.

In other words, the first clevis 110 and the second clevis 120 may move relative to each other by pivoting about the plurality of pins 240. The joint assembly 100 may therefore allow a limited amount of movement between the first component 102 and the second component 104 to accommodate stresses that result from movements of the first component 102 and/or the second component 104. The first clevis 110, the second clevis 120, and the ring 130 of the joint assembly 100 may function as a single unitary component, i.e., the joint assembly 100 is made and used as a single, one-piece component.

In some embodiments, the pin 240 may have a substantially T-shaped cross-section. Each pin 240 includes a head portion 242 received at least partially in a corresponding ring aperture 232 from the plurality of ring apertures 232. Each pin 240 further includes a shaft portion 244 extending from the head portion 242 and received at least partially within the corresponding ring aperture 232. The shaft portion 244 of each pin 240 is further at least partially received in the corresponding first bearing insert 218 or the corresponding second bearing insert 228 that is received in the corresponding first clevis aperture 216 or the corresponding second clevis aperture 226 aligned with the corresponding ring aperture 232.

Specifically, the shaft portion 244 of some of the pins 240 is at least partially received in the corresponding first ring aperture 234 from the set of first ring apertures 234 and the corresponding first bearing insert 218 that is received in the corresponding first clevis aperture 216 to rotatably couple the first clevis 110 to the ring 130. Similarly, the shaft portion 244 of some of the pins 240 is at least partially received in the corresponding second ring aperture 236 from the set of second ring apertures 236 and the corresponding second bearing insert 228 that is received in the corresponding second clevis aperture 226 to rotatably couple the second clevis 120 to the ring 130.

Figures 6A, 6B:
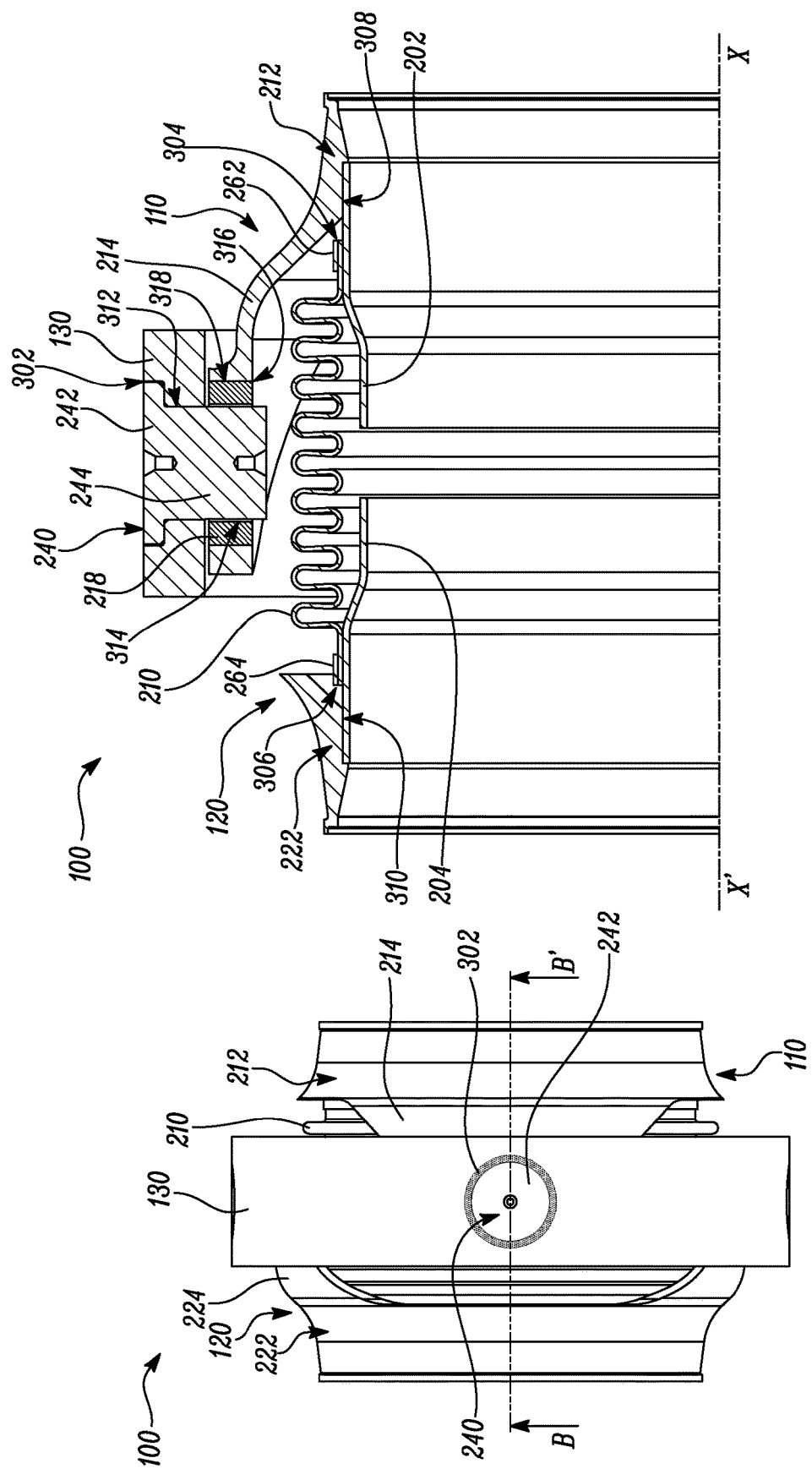
FIG. 6A is a schematic top view of the joint assembly of FIG. 4, according to an embodiment of the present disclosure.
FIG. 6B is a schematic sectional view of the joint assembly taken along a section line B-B' as shown in FIG. 6A, according to an embodiment of the present disclosure.

FIG. 6A illustrates a schematic top view of the joint assembly 100. As shown in FIG. 6A, one of the pins 240 is configured to rotatably couple the ring 130 to the first clevis 110. The head portion 242 of the pin 240 is coupled to the ring 130 by a corresponding weld 302.

In some embodiments, the weld 302 between the head portion 242 and the ring 130 includes an electron beam weld or a laser beam weld. The aforementioned welding techniques (i.e., electron and laser beam welding) may allow a repeatable and desirable weld penetration to be achieved as compared to conventional joining techniques, such as arc welding. Electron beam welding or laser beam welding are generally low heat input processes as compared to arc welding. Thus, the amount of material that is heat affected (or a weld heat affected zone) during the welding process is much less. This may allow for a lighter design (e.g., a lighter head portion 242) of the joint assembly 100 due to a larger amount of material retaining its original properties after the welding process.

It should be understood that the present disclosure is not restricted to the aforementioned welding techniques only, and generally any beam welding technique may be utilized for coupling the head portion 242 of the pin 240 to the ring 130. Further, the aforementioned welding techniques are equally applicable to all the pins 240 of the joint assembly 100 that rotatably coupled the ring 130 to each of the first clevis 110 and the second clevis 120.

FIG. 6B illustrates a schematic sectional view of the joint assembly 100 taken long a section line B-B' shown in FIG. 6A. The shown cross-section is only through an upper portion of the joint assembly 100 and the cross-section through the lower portion, which would be substantially similar and symmetric to the upper portion, is not shown. As shown in FIG. 6B, the bellows 210 is fixedly coupled to the first liner 202 and the second liner 204 through the respective sealing rings 262, 264. In some embodiments, the sealing rings 262, 264 may be coupled to ends of the bellows 210, for example, through welding.

In some embodiments, the bellows 210 is fixedly coupled to the first liner 202 by one or more first bellows welds 304. Similarly, the bellows 210 is fixedly coupled to the second liner 204 by one or more second bellows welds 306. The sealing rings 262, 264 may protect the bellows 210 by providing extra thickness at the ends of the bellows 210 as the bellows 210 is welded to the first liner 202 or the second liner 204. It should be understood that the bellows 210 may be coupled to the first liner 202 or the second liner 204 through any other suitable arrangements based on application requirements.

In some embodiments, the first clevis 110 is fixedly coupled to the first liner 202 by one or more first clevis welds 308. In some embodiments, the second clevis 120 is fixedly coupled to the second liner 204 by one or more second clevis welds 310. For example, the first and second clevises 110, 120 may be welded to the first and second liners 202, 204 through tungsten inert gas (TIG) welding, solid state welding, etc. The first liner 202 or the second liner 204 may transfer angular movements of the first component 102 (shown in FIG. 4) and the second component 104 (shown in FIG. 4) to the first and second clevises 110, 120 through the first clevis weld 308 and the second clevis weld 310, respectively. The first and second clevises 110, 120 may pivot about the plurality of pins 240 with respect to the ring 130 to accommodate the angular movements of the first component 102 (shown in FIG. 4) and the second component 104 (shown in FIG. 4).

The shaft portion 244 of each pin 240 is coupled to the ring 130 by a corresponding interference fit 312. The shaft portion 244 of some of the pins 240 is coupled to the corresponding first bearing insert 218 by a corresponding clearance fit 314, such that the shaft portion 244 is rotatable relative to the first bearing insert 218. Further, in some embodiments, each first bearing insert 218 is fixedly coupled to the first clevis 110 by a corresponding first insert weld 316 or a corresponding first interference fit 318. In should be understood that each first bearing insert 218 may be fixedly coupled to the first clevis 110 through any other known joining methods, such as, for example, brazing, adhesively bonding, screwing, bolting, and/or the like. In some embodiments, each first bearing insert 218 may be fixedly coupled to the first clevis 110 through a threaded connection.

Figure 7B:
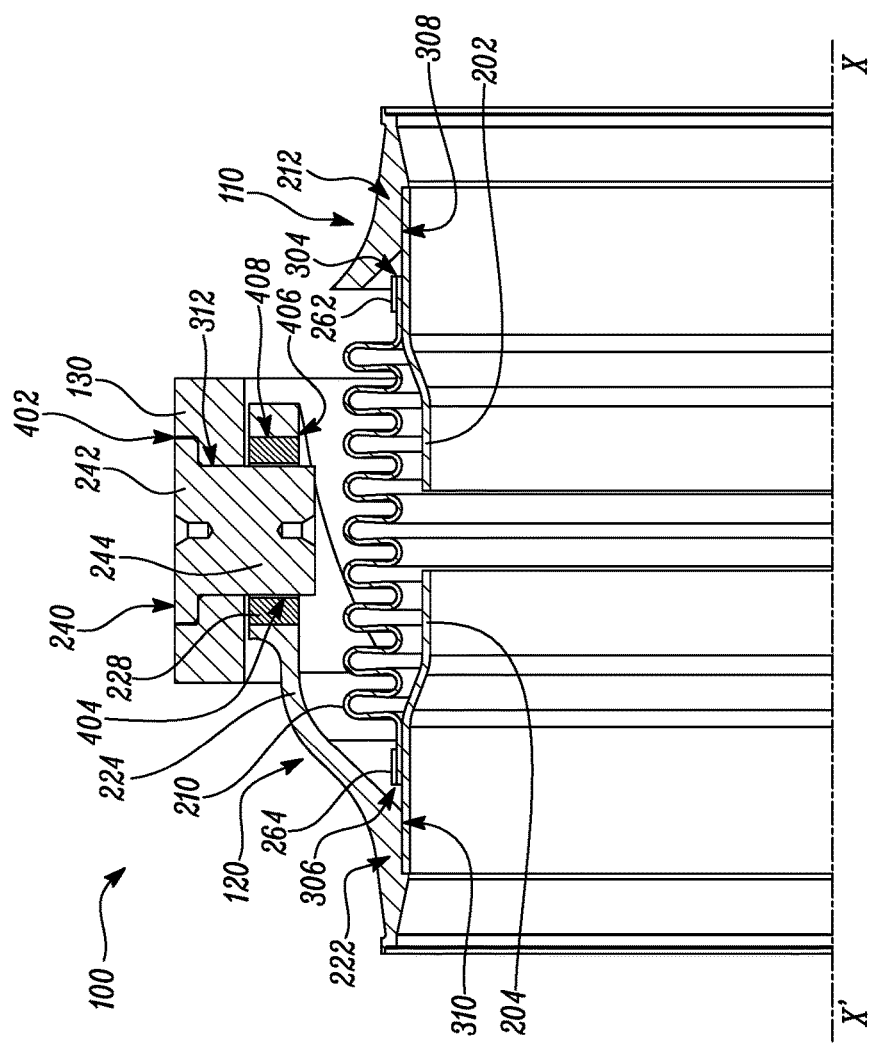
FIG. 7B is a schematic sectional view of the joint assembly taken along a section line C-C' as shown in FIG. 7A, according to an embodiment of the present disclosure.
Figure 7A:
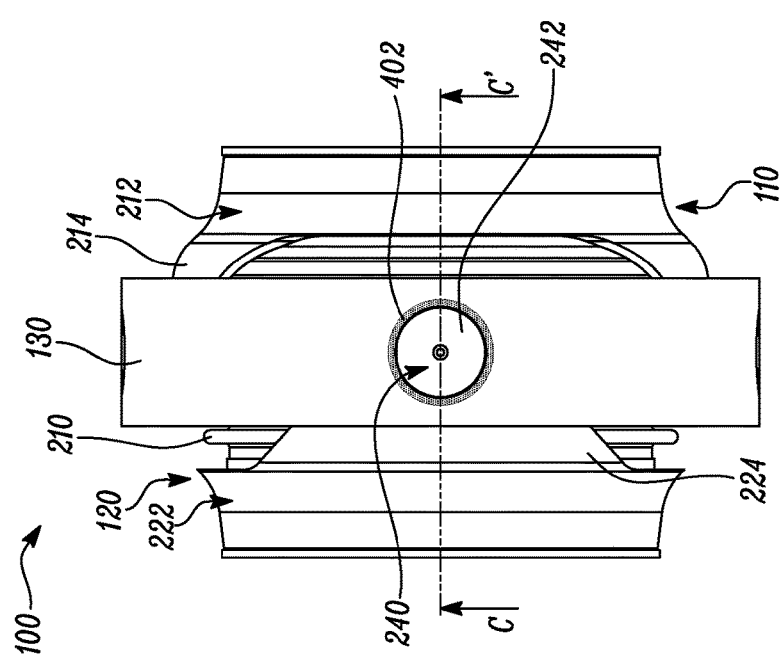
FIG. 7A is a schematic side view of the joint assembly of FIG. 4, according to an embodiment of the present disclosure.

FIG. 7A illustrates a schematic side view of the joint assembly 100. As shown in FIG. 7A, the pin 240 is configured to rotatably couple the ring 130 to the second clevis 120. The head portion 242 of the pin 240 is coupled to the ring 130 by a corresponding weld 402. In some embodiments, the weld 402 between the head portion 242 and the ring 130 includes an electron beam weld or a laser beam weld.

FIG. 7B illustrates a schematic sectional perspective view of the joint assembly 100 taken long a section line C-C' shown in FIG. 7A. The shown cross-section is only through an upper portion of the joint assembly 100 and the cross-section through the lower portion, which would be substantially similar and symmetric to the upper portion, is not shown.

The shaft portion 244 of some of the pins 240 is coupled to the corresponding second bearing insert 228 by a corresponding clearance fit 404, such that the shaft portion 244 is rotatable relative to the second bearing insert 228. Further, in some embodiments, each second bearing insert 228 is fixedly coupled to the second clevis 120 by a corresponding second insert weld 406 or a corresponding second interference fit 408. In should be understood that the second bearing insert 228 may be fixedly coupled to the second clevis 120 through any other known joining methods, such as, for example, brazing, adhesively bonding, screwing, bolting, and/or the like. In some embodiments, each second bearing insert 228 may be fixedly coupled to the second clevis 120 through a threaded connection.

Referring to FIGS. 6B and 7B, in some embodiments, each of the first and second bearing inserts 218, 228 may be a bushing or a cartridge bearing. In the latter case, the cartridge bearing may further eliminate static friction between the pin 240 and the first clevis 110 or the second clevis 120, thereby reducing bending stiffness and interface loads between the pin 240 and the corresponding first bearing insert 218 or the corresponding second bearing insert 228.

Referring now to FIGS. 6A, 6B, 7A and 7B, in some embodiments, the pin 240 may transfer load (e.g., a load path) between the ring 130 and the first clevis 110 or the second clevis 120 through the corresponding interference fit 312. The interference fit 312 may allow increase in load transfer between the ring 130 and the first clevis 110 or the second clevis 120 while also improving an efficiency of the load transfer. Thus, a joint assembly without the interference fit between the ring 130 and the first clevis 110 or the second clevis 120 may require a thicker and heavier ring.

The weld 302 (shown in FIG. 6A) or the weld 402 (shown in FIG. 7A) that couples the head portion 242 of the corresponding pin 240 to the ring 130 is located away from the corresponding interference fit 312 due to the specific shape of the pin 240 (i.e., substantially T-shaped design). This may displace the weld heat affected zone with weakened material properties away from the corresponding interference fit 312 that results in a robust design of the joint assembly 100. Additionally, the interference fit 312 may reduce a bending moment on the pin 240 that allows for a smaller, lighter pin or a higher load capacity of the joint assembly 100. This arrangement may also significantly reduce stresses on the welds 302, 402 (or other joints) between the head portion 242 of the pin 240 and the ring 130 that improves a fatigue life of the joint assembly 100.

In some embodiments, each of the first and second clevises 110, 120 is made of a clevis material (e.g., a nickel chromium-based alloy). Each of the pluralities of first and second bearing inserts 218, 228 is made of a bearing material different from the clevis material. For example, the bearing material may include a metal, an alloy, a composite material, or a polymeric material, such as rubber, polyurethane, silicone or equivalents. Suitable polymeric material may be chosen for dampening vibrations of the joint assembly 100. In some examples, the bearing material may have a relatively greater hardness of the one or more polymeric materials around a circumference of the pin 240 to achieve higher stiffness of material close to the pin 240 for resisting forces of the bellows 210.

In some embodiments, the polymetric material may need to be co-moulded between two support rings, such that the polymetric material may be press-fitted into the corresponding first clevis aperture 216 or the corresponding second clevis aperture 226, or even co-moulded into the corresponding first clevis aperture 216 or the corresponding second clevis aperture 226 itself. This may also provide the necessary abrasion resistance to the polymetric material. Further, in an application that requires reduction in stiffness of the joint assembly 100, polymetric material with low stiction or frictional properties may be utilised, such as polytetrafluoroethylene (PTFE).

In some embodiments, a hardness of the clevis material is different from a hardness of the bearing material. Further, in some embodiments, the hardness of the bearing material is greater than the hardness of the clevis material. This may allow use of relatively cheaper materials for the first clevis 110 or the second clevis 120 as compared to the bearing material for the first bearing insert 218 or the second bearing insert 228. Further, suitable bearing materials may be selected based on a desired stiffness of the joint assembly 100, desired mechanical strength and wear resistance of the bearing materials, and friction between the pin 240 and the first clevis 110 or the second clevis 120, while suitable clevis material may be selected for the first clevis 110 or the second clevis 120 based on ease of welding and machining. This may reduce an overall cost and weight of the joint assembly 100 as well as improve a service life of the joint assembly 100. Additionally, the joint assembly 100 of the present disclosure may allow replacement of the first and second bearing inserts 218, 228 during maintenance while reusing the first and second clevises 110, 120.

FIG. 8A illustrates a schematic sectional exploded view of an embodiment of the pin 240, the ring 130, and the first clevis 110 or the second clevis 120 of the joint assembly 100. FIG. 8B illustrates a detailed schematic sectional view of an embodiment of an assembly of the pin 240, the ring 130 and the first clevis 110 or the second clevis 120 of the joint assembly 100. In FIGS. 8A and 8B, the first and second clevises 110, 120 and the first and second bearing inserts 218, 228 are shown together as a single component for illustrative and descriptive purposes.

Referring now to FIGS. 8A and 8B, each pin 240 includes the head portion 242 and the shaft portion 244 extending from the head portion 242. In some embodiments, the head portion 242 has a minimum head diameter 502 and the shaft portion 244 has a maximum shaft diameter 504 less than the minimum head diameter 502 of the head portion 242. Thus, the pin 240 may have a substantially T-shaped cross section. In some embodiments, the shaft portion 244 includes a wide shaft section 510 disposed adjacent to the head portion 242 and having a minimum wide diameter 512.

Further, each ring aperture 232 includes a wide aperture portion 506 configured to at least partially receive the head portion 242 of the corresponding pin 240 and a narrow aperture portion 508 disposed adjacent to the wide aperture portion 506 and configured to at least partially receive the shaft portion 244 of the corresponding pin 240. The wide shaft section 510 of the shaft portion 244 of the pin 240 is at least partially received in the corresponding ring aperture 232.

In some embodiments, a diameter 509 of the narrow aperture portion 508 is larger than the minimum wide diameter 512 of the wide shaft section 510 of the corresponding pin 240. In some embodiments, the diameter 509 of the narrow aperture portion 508 is just large enough to at least partially receive the wide shaft section 510 of the shaft portion 244 of the corresponding pin 240 to provide the corresponding interference fit 312. Further, a diameter 507 of the wide aperture portion 506 is larger than a maximum head diameter 503 to at least partially receive the head portion 242 of the corresponding pin.

In some embodiments, the shaft portion 244 further includes a narrow shaft section 514 disposed adjacent to the wide shaft section 510 opposite to the head portion 242 and having a maximum narrow diameter 516 less than the minimum wide diameter 512 of the wide shaft section 510. The narrow shaft section 514 is at least partially received in the corresponding first bearing insert 218 or the corresponding second bearing insert 228. In some embodiments, the maximum narrow diameter 516 of the narrow shaft section 514 of the pin 240 is smaller than an inner diameter 518 of the corresponding first bearing insert 218 or the corresponding second bearing insert 228 to form the corresponding clearance fit 314, 404 therewith. In some embodiments, the shaft portion 244 further includes a step 520 disposed between the wide and narrow shaft sections 510, 514. In some embodiments, the step 520 separates the wide shaft section 510 from the narrow shaft section 514.

The various sections of the shaft portion 244, i.e., the wide shaft section 510, the narrow shaft section 514, and the step 520, may allow for a quick and clean assembly of the pin 240, the ring 130 and the corresponding first bearing inert 218 or the corresponding second bearing insert 228. The narrow shaft section 514 may allow manual alignment of the ring 130 with the corresponding first bearing inert 218 or the corresponding second bearing insert 228 until the corresponding pin 240 is pressed through a pressing machine and the wide shaft section 510 forms the corresponding interference fit 312 with the narrow aperture portion 508 of the corresponding ring aperture 232. This may eliminate damage to the ring 130 or the first and second clevises 110, 120 during assembly due to misalignment, which in turn reduces scrappage during manufacture of the joint assembly 100.

Figure 9B:
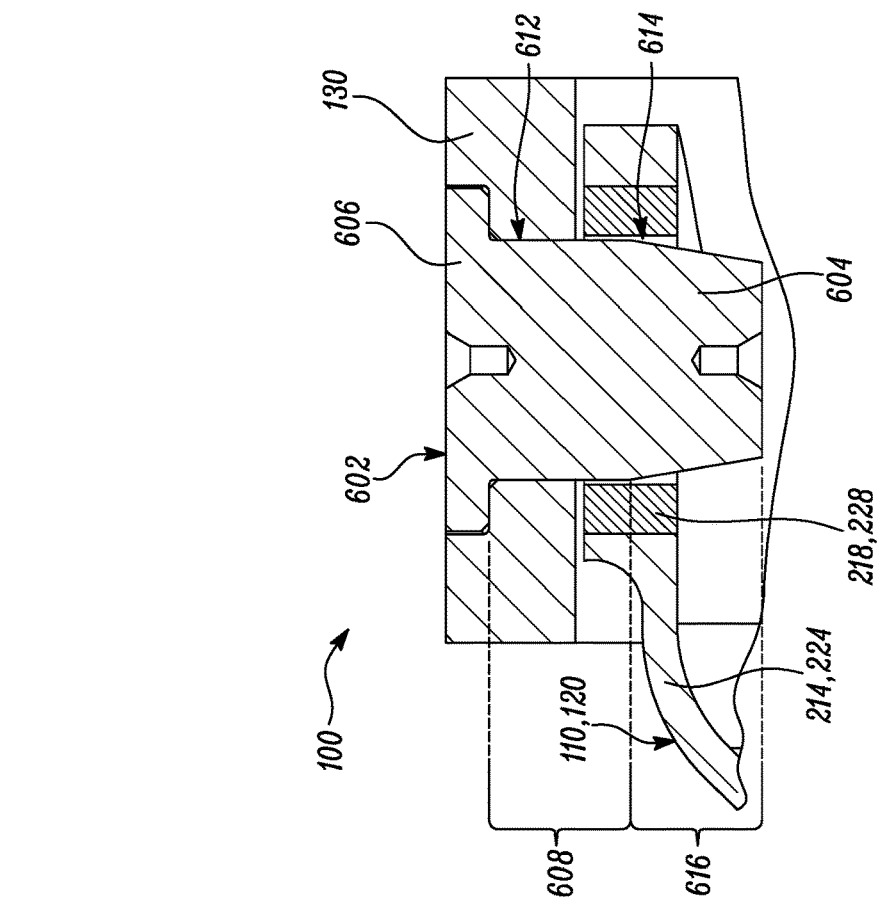
FIG. 9B is a detailed schematic sectional view of the pin, the ring, and the first clevis or the second clevis of FIG. 9A in an assembled state, according to an embodiment of the present disclosure.
Figure 9A:
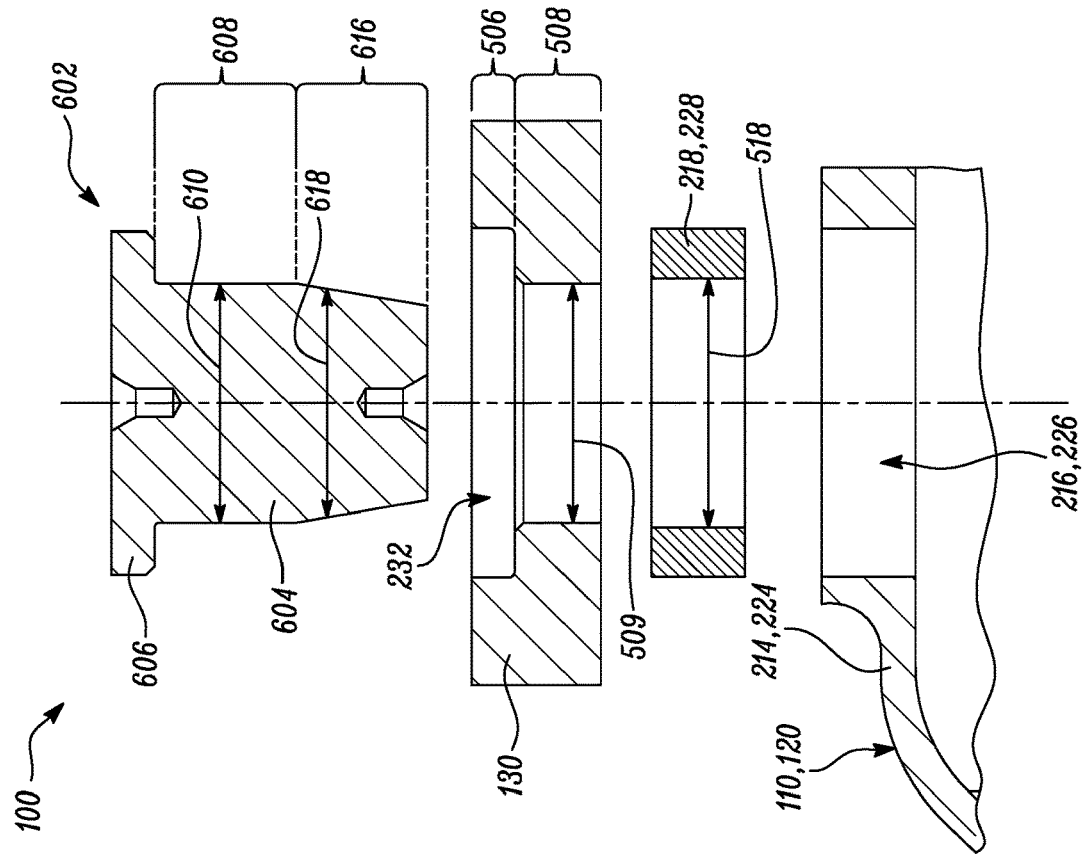
FIG. 9A is a schematic sectional exploded view of the pin, the ring, and the first clevis or the second clevis, according to another embodiment of the present disclosure.

FIG. 9A illustrates a detailed schematic sectional exploded view of a pin 602, the ring 130, and the first clevis 110 or the second clevis 120 of the joint assembly 100, according to another embodiment of the present disclosure. FIG. 9B illustrates a detailed schematic sectional view of the pin 602, the ring 130, and the first clevis 110 or the second clevis 120 of the joint assembly 100 in an assembled state. In the illustrated embodiments of FIGS. 9A and 9B, the joint assembly 100 includes the pin 602 instead of the pin 240

(shown in FIGS. 4-8B). In FIGS. 9A and 9B, the first and second clevises 110, 120 are shown together as a single component and the first and second bearing inserts 218, 228 are shown together as a single component for illustrative and descriptive purposes.

Referring now to FIGS. 9A and 9B, the pin 602 includes a head portion 606 and a shaft portion 604 extending from the head portion 606. The shaft portion 604 of the pin 602 includes a uniform shaft section 608 disposed adjacent to the head portion 606 and having a substantially uniform shaft diameter 610. The uniform shaft section 608 is at least partially received in the corresponding ring aperture 232 and in the corresponding first bearing insert 218 or the corresponding second bearing insert 228.

In some embodiments, the diameter 509 of the narrow aperture portion 508 is just large enough to at least partially receive the uniform shaft section 608 of the shaft portion 604 of the corresponding pin 602 to form a corresponding interference fit 612. Further, the uniform shaft section 608 forms a clearance fit 614 with the corresponding first bearing insert 218 or the corresponding second bearing insert 228. In some embodiments, the uniform shaft diameter 610 of the uniform shaft section 608 of the pin 240 is smaller than the inner diameter 518 of the corresponding first bearing insert 218 or the corresponding second bearing insert 228 to form the corresponding clearance fit 614 therewith.

In some embodiments, the shaft portion 604 further includes a tapered shaft section 616 disposed adjacent to the uniform shaft section 608 opposite to the head portion 606 and tapering away from the uniform shaft section 608. The tapered shaft section 616 has an average diameter 618 less than the uniform shaft diameter 610 of the uniform shaft section 608. The tapered shaft section 616 at least partially extends out of the corresponding first clevis aperture 216 or the corresponding second clevis aperture 226 aligned with the corresponding ring aperture 232. The tapered shaft section 616 may align the ring 130 with the corresponding first bearing insert 218 or the corresponding second bearing insert 228 as the pin 602 is at least partially received through the corresponding ring aperture 232 and through the corresponding first bearing inert 218 or the corresponding second bearing insert 228.

FIG. 10A illustrates a detailed schematic sectional exploded view of a pin 702, the ring 130, and the first clevis 110 or the second clevis 120 of the joint assembly 100, according to yet another embodiment of the present disclosure. FIG. 10B illustrates a detailed schematic sectional view of the pin 702, the ring 130, and the first clevis 110 or the second clevis 120 of the joint assembly 100 in an assembled state. In the illustrated embodiments of FIGS. 10A and 10B, the joint assembly 100 includes the pin 702 instead of the pin 240 (shown in FIGS. 4-8B). In FIGS. 10A and 10B, the first and second clevises 110, 120 are shown together as a single component and the first and second bearing inserts 218, 228 are shown together as a single component for illustrative and descriptive purposes.

Referring now to FIGS. 10A and 10B, the pin 702 includes a head portion 706 and a shaft portion 704 extending from the head portion 706. Each pin 702 further includes an aid guide 708 removably attached to an end 710 of the shaft portion 704 distal to the head portion 706. The aid guide 708 tapers away from the end 710 of the shaft portion 704, such that the aid guide 708 is configured to align the corresponding ring aperture 232 with the corresponding first bearing insert 218 or the corresponding second bearing insert 228 as the shaft portion 704 is at least partially received through the corresponding ring aperture 232 and through the corresponding first bearing insert 218 or the corresponding second bearing insert 228.

In some embodiments, the aid guide 708 may be removably coupled (e.g., through adhesives, screws, etc.) to the end 710 of the shaft portion 704 such that the aid guide 708 may be removed after final assembly of the joint assembly 100.

Figure 11:
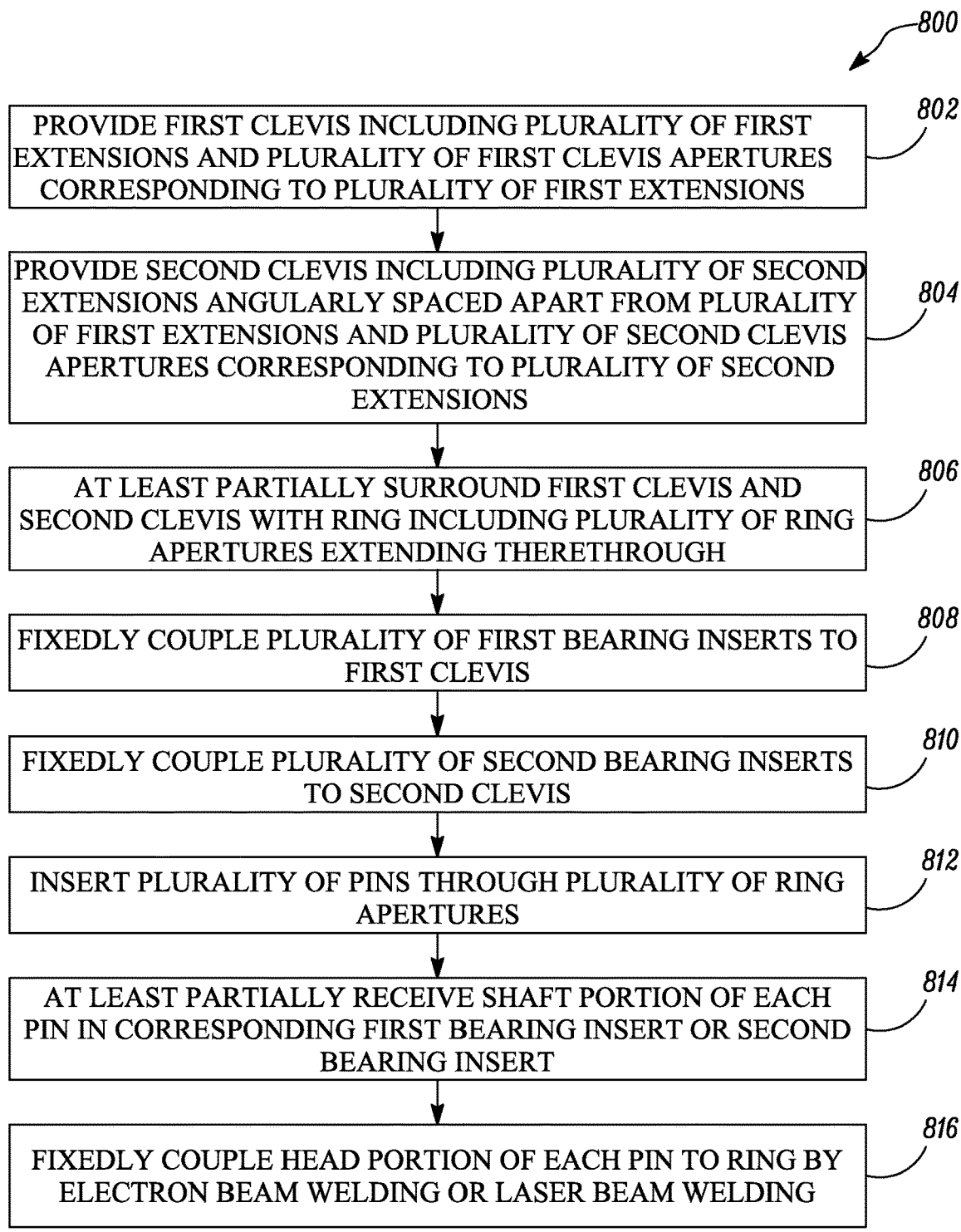
FIG. 11 is a flow chart illustrating a method of manufacturing a joint assembly, according to an embodiment of the present disclosure.

FIG. 11 is a flow chart illustrating a method 800 of manufacturing a joint assembly. The joint assembly may be similar to the joint assembly 100 of FIGS. 4-10B.

In some embodiments, the method 800 includes fixedly coupling the bellows 210 to the first liner 202 by one or more first bellows welds 304. The first liner 202 is configured to be coupled to the first component 102. In some embodiments, the method 800 further includes fixedly coupling the bellows 210 to the second liner 204 by one or more second bellows welds 306. The second liner 204 is configured to be coupled to the second component 104.

At step 802, the method 800 further includes providing the first clevis 110 including the plurality of first extensions 214 and the plurality of first clevis apertures 216 corresponding to the plurality of first extensions 214. Each first extension 214 defines the corresponding first clevis aperture 216 from the plurality of first clevis apertures 216 therethrough. In some embodiments, the method 800 further includes fixedly coupling the first clevis 110 to the first liner 202 by one or more first clevis welds 308.

At step 804, the method 800 further includes providing the second clevis 120 including the plurality of second extensions 224 angularly spaced apart from the plurality of first extensions 214 of the first clevis 110 and the plurality of second clevis apertures 226 corresponding to the plurality of second extensions 224. Each second extension 224 defines the corresponding second clevis aperture 226 from the plurality of second clevis apertures 226 therethrough. In some embodiments, the method 800 further includes fixedly coupling the second clevis 120 to the second liner 204 by one or more second clevis welds 310.

At step 806, the method 800 further includes at least partially surrounding the first clevis 110 and the second clevis 120 with the ring 130 including the plurality of ring apertures 232 extending therethrough, such that each of the set of first ring apertures 234 from the plurality of ring apertures 232 aligns with the corresponding first clevis aperture 216 from the plurality of first clevis apertures 216 of the first clevis 110 and each of the set of second ring apertures 236 from the plurality of ring apertures 232 aligns with the corresponding second clevis aperture 226 from the plurality of second clevis apertures 226 of the second clevis 120.

At step 808, the method 800 further includes fixedly coupling the plurality of first bearing inserts 218 to the first clevis 110, such that each first bearing insert 218 is at least partially received within the corresponding first clevis aperture 216 from the plurality of first clevis apertures 216. In some embodiments, each first bearing insert 218 is fixedly coupled to the first clevis 110 by the corresponding first insert weld 316 or the corresponding first interference fit 318.

At step 810, the method 800 further includes fixedly coupling the plurality of second bearing inserts 228 to the second clevis 120, such that each second bearing insert 228 is at least partially received within the corresponding second clevis aperture 226 from the plurality of second clevis apertures 226. In some embodiments, each second bearing insert 228 is fixedly coupled to the second clevis 120 by the corresponding second insert weld 406 or the corresponding second interference fit 408.

At step 812, the method 800 further includes inserting the plurality of pins 240, 602, 702 through the plurality of ring apertures 232, such that the head portion 242, 606, 706 of each pin 240, 602, 702 is at least partially received in the corresponding ring aperture 232 from the plurality of ring apertures 232, and the shaft portion 244, 604, 704 of each pin 240, 602, 702 is at least partially received in the corresponding ring aperture 232. The shaft portion 244, 604, 704 of each pin 240, 602, 702 is fixedly coupled to the ring 130 by the corresponding interference fit 312.

In some embodiments, the method 800 further includes removably attaching the aid guide 708 to the end 710 of the shaft portion 704 of each pin 702 distal to the head portion 706. The aid guide 708 tapers away from the end 710 of the shaft portion 704, such that the aid guide 708 is configured to align the corresponding ring aperture 232 with the corresponding first bearing insert 218 or the corresponding second bearing insert 228 as the shaft portion 704 is at least partially received through the corresponding ring aperture 232 and through the corresponding first bearing insert 218 or the corresponding second bearing insert 228.

At step 814, the method 800 further includes at least partially receiving the shaft portion 244, 604, 704 of each pin 240, 602, 702 in the corresponding first bearing insert 218 or the corresponding second bearing insert 228 that is received in the corresponding first clevis aperture 216 or the corresponding second clevis aperture 226 aligned with the corresponding ring aperture 232. The shaft portion 244, 604, 704 of each pin 240, 602, 702 is rotatably coupled to the corresponding first bearing insert 218 or the corresponding second bearing insert 228 by the corresponding clearance fit 314, 404, 614 such that each of the first and second clevises 110, 120 is rotatably coupled to the ring 130.

At step 816, the method 800 further includes fixedly coupling the head portion 242, 606, 706 of each pin 240, 602, 702 to the ring 130 by electron beam welding or laser beam welding.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A joint assembly for joining a first component to a second component, the joint assembly comprising:
   a first liner configured to be coupled to the first component;
   a second liner configured to be coupled to the second component;
   a bellows fixedly coupled to each of the first liner and the second liner so that the first liner and second liner are interior to the bellows;
   a first clevis fixedly coupled to the first liner and at least partially enclosing the first liner and the bellows, the first clevis comprising a plurality of first extensions and a plurality of first clevis apertures corresponding to the plurality of first extensions, wherein each first extension defines a corresponding first clevis aperture from the plurality of first clevis apertures therethrough;
   a second clevis fixedly coupled to the second liner and at least partially enclosing the second liner and the bellows, the second clevis comprising a plurality of second extensions angularly spaced apart from each of the plurality of first extensions of the first clevis and a plurality of second clevis apertures corresponding to the plurality of second extensions, wherein each second extension defines a corresponding second clevis aperture from the plurality of second clevis apertures therethrough;
   a ring at least partially surrounding the first clevis and the second clevis and comprising a plurality of ring apertures extending therethrough, wherein the plurality of ring apertures comprises a set of first ring apertures corresponding to the plurality of first clevis apertures and a set of second ring apertures corresponding to the plurality of second clevis apertures, wherein each first ring aperture is aligned with a corresponding first clevis aperture from the plurality of first clevis apertures of the first clevis, and each second ring aperture is aligned with a corresponding second clevis aperture from the plurality of second clevis apertures of the second clevis;
   a plurality of pins corresponding to the plurality of ring apertures of the ring and configured to rotatably couple the ring to each of the first clevis and the second clevis, each pin comprising:
      a head portion received at least partially in a corresponding ring aperture from the plurality of ring apertures, wherein the head portion is coupled to the ring by a corresponding weld; and
      a shaft portion extending from the head portion and received at least partially within the corresponding ring aperture;
   a plurality of first bearing inserts fixedly coupled to the first clevis, wherein each first bearing insert is at least partially received within a corresponding first clevis aperture from the plurality of first clevis apertures; and
   a plurality of second bearing inserts fixedly coupled to the second clevis, wherein each second bearing insert is at least partially received within a corresponding second clevis aperture from the plurality of second clevis apertures, wherein
   the shaft portion of each pin is coupled to the ring by a corresponding interference fit away from the corresponding weld,
   the shaft portion of each pin is further at least partially received in the corresponding first bearing insert or the corresponding second bearing insert that is received in the corresponding first clevis aperture or the corresponding second clevis aperture aligned with the corresponding ring aperture, and
   the shaft portion of each pin is coupled to the corresponding first bearing insert or the corresponding second bearing insert by a corresponding clearance fit, such that the shaft portion is rotatable relative to the corresponding first bearing insert or the corresponding second bearing insert.

2. The joint assembly of claim 1, wherein the weld between the head portion and the ring comprises an electron beam weld or a laser beam weld.

3. The joint assembly of claim 1, wherein the head portion has a minimum head diameter and the shaft portion has a maximum shaft diameter less than the minimum head diameter of the head portion.

4. The joint assembly of claim 1, wherein each ring aperture comprises a wide aperture portion configured to at least partially receive the head portion of the corresponding pin and a narrow aperture portion adjacent to the wide aperture portion and configured to at least partially receive the shaft portion of the corresponding pin.

5. The joint assembly of claim 1, wherein the shaft portion comprises:
 a wide shaft section adjacent to the head portion and having a minimum wide diameter, wherein the wide shaft section is at least partially received in the corresponding ring aperture;
 a narrow shaft section adjacent to the wide shaft section opposite to the head portion and having a maximum narrow diameter less than the minimum wide diameter of the wide shaft section, wherein the narrow shaft section is at least partially received in the corresponding first bearing insert or the corresponding second bearing insert; and
 a step between the wide shaft section and the narrow shaft section.

6. The joint assembly of claim 1, wherein the shaft portion comprises:
 a uniform shaft section adjacent to the head portion and having a substantially uniform shaft diameter, wherein the uniform shaft section is at least partially received in the corresponding ring aperture and in the corresponding first bearing insert or the corresponding second bearing insert; and
 a tapered shaft section adjacent to the uniform shaft section opposite to the head portion and tapering away from the uniform shaft section, the tapered shaft section having an average diameter less than the uniform shaft diameter of the uniform shaft section, wherein the tapered shaft section at least partially extends out of the corresponding first clevis aperture or the corresponding second clevis aperture aligned with the corresponding ring aperture.

7. The joint assembly of claim 1, wherein each pin further comprises an aid guide removably attached to an end of the shaft portion distal to the head portion, and the aid guide tapers away from the end of the shaft portion, such that the aid guide is configured to align the corresponding ring aperture with the corresponding first bearing insert or the corresponding second bearing insert as the shaft portion is at least partially received through the corresponding ring aperture and through the corresponding first bearing insert or the corresponding second bearing insert.

8. The joint assembly of claim 1, wherein each of the pluralities of the first bearing inserts and the second bearing inserts has an annular shape.

9. The joint assembly of claim 1, wherein each of the first clevis and the second clevis is made of a clevis material, each of the pluralities of the first bearing inserts and the second bearing inserts is made of a bearing material different from the clevis material, and a hardness of the clevis material is different from a hardness of the bearing material.

10. The joint assembly of claim 1, wherein each first bearing insert is fixedly coupled to the first clevis by a corresponding first insert weld or a corresponding first interference fit.

11. The joint assembly of claim 1, wherein each second bearing insert is fixedly coupled to the second clevis by a corresponding second insert weld or a corresponding second interference fit.

12. The joint assembly of claim 1, wherein the first clevis is fixedly coupled to the first liner by one or more first clevis welds.

13. The joint assembly of claim 1, wherein the second clevis is fixedly coupled to the second liner by one or more second clevis welds.

14. The joint assembly of claim 1, wherein the bellows is fixedly coupled to the first liner by one or more first bellows welds.

15. The joint assembly of claim 1, wherein the bellows is fixedly coupled to the second liner by one or more second bellows welds.

16. A gas turbine engine including:
 a first component;
 a second component; and
 a joint assembly according to claim 1, the joint assembly joining the first component to the second component.

* * * * *